Nov. 26, 1946.  L. B. LYNN ET AL  2,411,550
STABILIZING APPARATUS
Filed July 25, 1945   2 Sheets-Sheet 1

INVENTORS
LAWRENCE B. LYNN,
CLINTON R. HANNA.
BY
ATTORNEY

Nov. 26, 1946.  L. B. LYNN ET AL  2,411,550
STABILIZING APPARATUS
Filed July 25, 1945  2 Sheets-Sheet 2

WITNESSES:
J. K. Mosser
H. B. Brown

INVENTORS
LAWRENCE B. LYNN,
CLINTON R. HANNA.
BY
ATTORNEY

Patented Nov. 26, 1946

2,411,550

UNITED STATES PATENT OFFICE 2,411,550

STABILIZING APPARATUS

Lawrence B. Lynn, Wilkinsburg, and Clinton R. Hanna, Pittsburgh, Pa., assignors to Westinghouse Electric Corporation, East Pittsburgh, Pa., a corporation of Pennsylvania Application July 25, 1945, Serial No. 606,960

8 Claims. (Cl. 74—5)

The invention relates to apparatus for damping nutational oscillations of gyro apparatus and it has for an object to provide means of this character wherein the inertia member has centering springs to provide for amplitude of eccentric or transverse movement for energy dissipation adequate to suppress oscillations induced by severe shocks, such as encountered due to firing of a gun.

In our application Serial No. 524,560, filed March 1, 1944, there is disclosed and claimed an improved stable element having a nutational damper for damping nutational oscillations. The gyro-vertical shown employs a neutral gyro constrained by a pendulous erector so that the spin axis seeks a vertical position; however, because of unavoidable gimbal and motor bearing friction, there is a tendency for the gyro and its housing to oscillate or wobble in a conical manner. As such nutational oscillation is sustained by motor bearing friction, unless damped or impeded, it may build up to a destructive magnitude and it is for this reason that a nutational damper is employed, the damper including an inertia member movable in an eccentric manner or transversely of the spin axis to develop friction for dissipation of vibration energy.

Where a shock of large magnitude is encountered, such as that due to gun fire, there is induced nutational movement of large amplitude for which the range of the damper disclosed in said application is not adequate. In accordance with the present invention, additional range of movement of the inertia member is provided for by increasing the clearance; and, to avoid a random mass unbalance of too large a magnitude being impressed on the gyro, centering springs act on the inertia member to center the latter within permissible limits under normal operating conditions of small nutation amplitudes. Accordingly, a more particular object of the invention is to provide a nutational damper wherein the inertia member has a range of movement sufficient to damp nutational oscillations of large magnitude and induced because of shock conditions and which is centered by means of springs to avoid undesired effects being impressed on the gyro.

A further object of the invention is to provide apparatus of the character just described wherein the inertia member bears on prebent springs which follow the latter to provide a more uniform friction condition in the event of any tendency of the inertia member to move upwardly therefrom.

While there is advantage in choosing a value of spring centering rate to make the inertia member resonant at the nutation frequency; however, as the nutation frequency is proportional to spin rate, a damper tuned to the nutation frequency at running speed of the gyro has been found to be too strongly centered for good damping while the gyro is coming up to speed or slowing down. To provide for improved operation under acceleration, normal speed, and slowing down conditions, the natural frequency of the damper is made less than that of nutation of the gyro at the normal running speed of the latter, the natural frequency preferably being of the order of two-thirds of the nutation frequency. Accordingly, a further object of the invention is to provide centering means for the inertia member of a nutation damper such that the natural frequency of the centering spring means and the inertia member is about two-thirds that of the nutation frequency of the gyro at the normal running speed.

These and other objects are effected by the invention as will be apparent from the following description and claims taken in connection with the accompanying drawings, forming a part of this application, in which:

Figure 1:
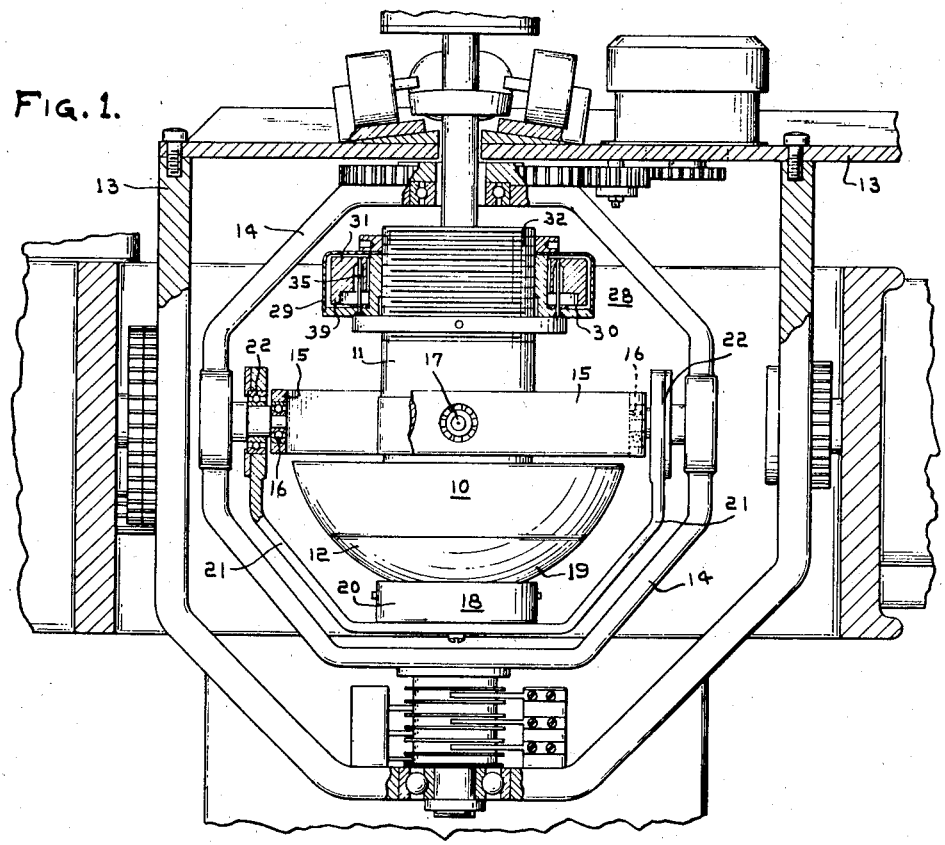
Fig. 1 is a sectional detail view showing a gyro-vertical having the improved damper applied thereto.

In the drawings there is shown a gyro, for example, a gyro-vertical, at 10, including a housing 11 having a rotor 12 journaled therein. As shown, the housing is supported from suitable structure, such as the level member 13, by means of a rotating gimbal suspension, such suspension including a rotatable cage 14 carried by the level, a gimbal ring 15 supported from the cage by pivot bearings 16, 16 and supporting the housing 11 by gimbal bearings 17, 17. The axis of the bearings 17, 17 is at right angles both to the spin axis of the gyro and to the axis of the bearings 16, 16.

The gyro-vertical also includes a pendulous erector, at 18, which exercises a gravitational constraint on the gyro tending to cause the spin axis to seek a vertical position. As shown, the erector includes a spherical metallic element 19 rotatably carried by the rotor and with which cooperates the magnet 20 suspended in a pendulous manner. The magnet 20 is carried by a ball 21 supported from the cage by bearings 22, 22 coaxial with the bearings 16, 16. As such pendulous suspension provides for the magnet being maintained in the vertical, any tendency of the gyro spin axis to deviate from the vertical results in eddy current torque being exerted on the gyro to cause it to precess to the vertical, as more fully disclosed in the application aforesaid.

Unless provision is made for damping of nutational oscillations, such oscillations will be initiated and sustained particularly because of friction of the motor bearings and the oscillations may build up to destructive magnitudes.

A nutational damper is shown, at 28, and which is effective to damp nutational oscillations, the energy of such oscillations being dissipated due to friction of the damper. The damper includes a casing 29 connected to the housing 11 and provided with an annular chamber 30 coaxial with the rotor spin axis. Within the chamber 30, there is disposed an annular inertia member 31 having clearance with respect to the inner and outer circumferential and the top walls of the chamber.

As the gyro is a neutral one, its center of gravity is necessarily at the intersection of the gimbal and spin axes. The damper is, therefore, adjustable with respect to the housing by the threaded connection 32 between the hub 33 of the housing and the casing 11, a jamb nut 34 providing for locking of the damper in position for the neutral or balanced condition.

The inertia member 31 is centered by two or more springs 35 acting thereon and connected to the bottom 36 of the housing 29. As shown, each spring is of the cantilever type secured, at its lower end, to the bottom wall 36 and having its upper end slidably fitting an opening 37 formed in the inertia member. The inertia member has counterbores 38 for the openings 37 and which provide space for deflection of the springs 35.

The inertia member has a circumferential bearing rib 39 at its bottom; and, to assure of distributed friction under operating conditions, instead of the rib bearing directly on the bottom wall 36 of the housing, it is borne by prebent leaf spring means carried by the housing and flattened by the mass of the inertia member against the resisting force thereof.

Figure 2:
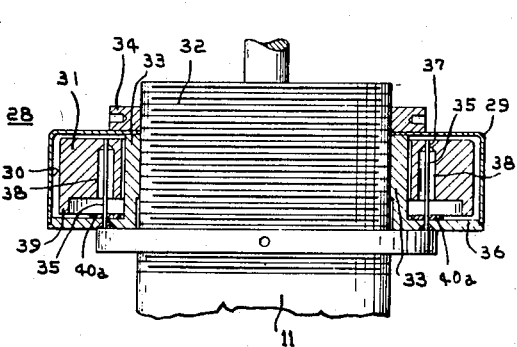
Fig. 2 is an enlarged sectional view of the damper.
Figure 3:
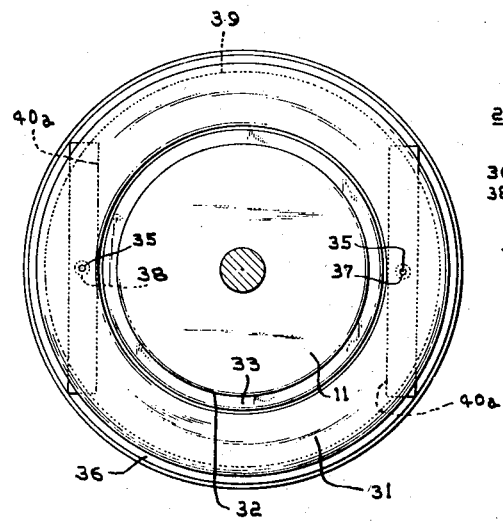
Fig. 3 is a plan view of the damper shown in Fig. 1 with the cover removed.
Figure 4:
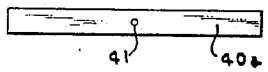
Figs. 4 and 5 are detail views of bottom springs for the inertia member.
Figure 5:
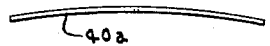

In Figs. 1 to 5, inclusive, the spring means at the bottom of the housing and acting upwardly on the rib 39 is constituted by a pair of spring strips 40a, the strips being arranged in a chordal manner with respect to the interior of the housing and being held in place by the springs 35 passing through openings 41 formed therein.

Figure 6:
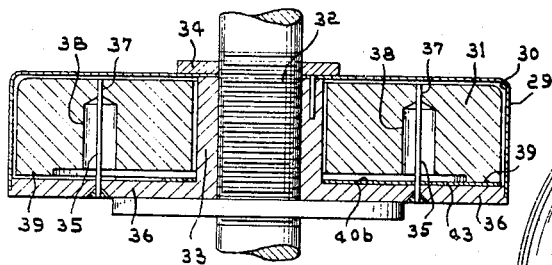
Fig. 6 is a sectional view showing an alternative form of nutation damper.
Figure 7:
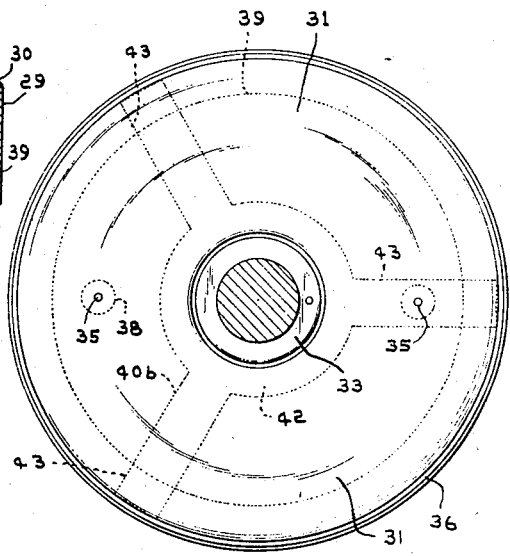
Fig. 7 is a plan view of apparatus shown in Fig. 6.
Figure 8:
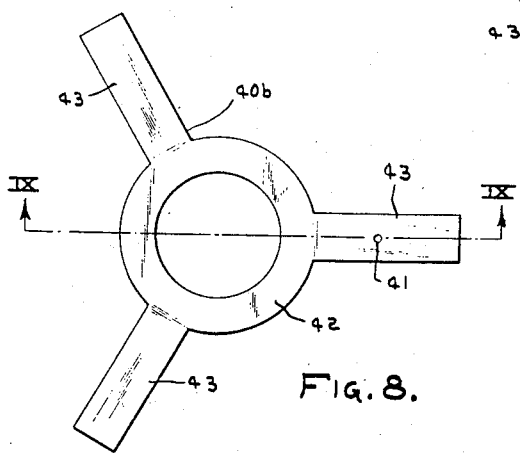
Fig. 8 is a detail view of the bottom spring of the damper of Fig. 6.
Figure 9:
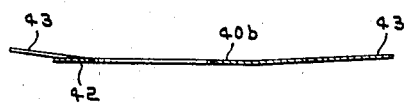
Fig. 9 is a sectional view taken along the line IX—IX of Fig. 8.

In Figs. 6 to 9, inclusive, the spring means 40b is constituted by a central annulus 42 having radial tongues 43 extending therefrom, the annulus encompassing the central hub 33 of the housing. The spring means is of sufficient thickness to exert the desired upward force on the inertia member and it is prebent to a suitable extent.

In Figs. 1 to 5, inclusive, the spring strips 40a are bowed or prebent so that the ends thereof act upwardly against the rib 36. Similarly, in Figs. 5 to 8, inclusive, the radial tongues 40 are prebent upwardly to act on the rib.

Preferably, the spring means, 40a or 40b, exerts upward force on the inertia member such that the magnitude of the force is of the order of three quarters of the gravitational force exerted thereon.

In the presence of vertical vibration, without the springs, the inertia member and bottom plate separate and are out of contact for a considerable part of the time. Under this condition the average friction loss in the damper for nutation oscillations, in a horizontal plane is reduced and the effectiveness of the damper diminished.

With the springs, friction contact between the inertia member and case of the damper is never broken, and the effectiveness of the damper in the presence of vertical vibration is maintained.

Without such spring means and with the rib 39 bearing directly on the bottom wall 36 of the housing, operating conditions may occur such that the normal force due to gravity is not distributed uniformly but may be variable along the rib. Where the spring means is employed, any tendency for the normal force to be relieved at any point due to action of the inertia member is countered by that of the spring means, tendency of the inertia member to move away from the bottom wall being accompanied by following movement of the spring means to preserve the normal force to a substantial extent.

While the invention has been shown in several forms, it will be obvious to those skilled in the art that it is not so limited, but is susceptible of various other changes and modifications without departing from the spirit thereof.

What is claimed is:

1. In a gyro apparatus wherein a gyro rotor is journaled in a housing supported by gimbal means, apparatus for damping nutational oscillations of the housing and rotor comprising a casing connected to the housing, an inertia member within the casing and arranged for movement therein radially with respect to the rotor spin axis, said casing and inertia member having friction bearing surfaces which cooperate to dissipate energy of nutational oscillations incident to radial movement of the inertia member relative to the casing, and spring means connected to the casing and acting on the inertia member to oppose radial movement thereof relative to the casing.

2. Apparatus claimed in claim 1 wherein the stiffness of the spring means is such that the vibrational frequency thereof and of the inertia member is less than the nutational frequency and greater than one-half of the latter.

3. Apparatus as claimed in claim 1 wherein the damper casing is connected to the housing by screw thread means to provide location of the center of gravity of the gyro rotor, casing and damper aggregate at the point of intersection of the spin and gimbal axes.

4. In a gyro apparatus wherein a gyro rotor is journaled in a housing supported by gimbal means, apparatus for damping nutational oscillations of the housing and rotor comprising an annular casing connected to the housing and coaxial with the rotor spin axis, an annular inertia member within the annular casing and having radial clearance with respect to the inner and outer circumferential walls of the latter to accommodate eccentric displacement thereof to provide friction for energy dissipation, and a plurality of spring pins for centering the inertia member with respect to the rotor spin axis, said spring pins having their lower ends attached to the bottom wall of the casing and having their upper ends connected to the inertia member so as to undergo deflection incident to displacement of the inertia member.

5. In a gyro apparatus wherein a gyro rotor is journaled in a housing supported by gimbal means, apparatus for damping nutational oscillations of the housing and rotor comprising an annular casing connected to the housing and coaxial with the rotor spin axis, an annular inertia member within the annular casing and having radial clearance with respect to the inner and outer circumferential walls of the latter to accommodate eccentric displacement thereof to provide friction for energy dissipation, and a plurality of spring pins for centering the inertia member with respect to the rotor spin axis, said spring pins having their lower ends attached to the bottom wall of the casing and having their upper ends fitting openings formed in the inertia member and said openings being counterbored from the bottom surface of the inertia member nearly to the top surface thereof to provide connecting portions for the upper ends of the pins and clearance spaces accommodating deflection of the latter incident to eccentric displacement of the inertia member, the spring stiffness of said pins being such that the vibrational frequency thereof and of the inertia member is less than the nutational frequency and greater than one-half of the latter.

6. In a gyro apparatus wherein a gyro rotor is journaled in a housing supported by gimbal means, apparatus for damping nutational oscillations of the housing and rotor comprising an annular casing connected to the housing and coaxial with the rotor spin axis, an annular inertia member within the annular casing and having radial clearance with respect to the inner and outer walls of the latter to accommodate eccentric displacement thereof in the casing to provide friction for energy dissipation, and spring means connected to the casing and acting on the inertia member to center the latter with respect to the rotor spin axis.

7. In a gyro apparatus wherein a gyro rotor is journaled in a housing supported by gimbal means, apparatus for damping nutational oscillations of the housing and rotor comprising an annular casing connected to the housing and coaxial with the rotor spin axis, an annular inertia member within the annular casing and having radial clearance with respect to the inner and outer walls of the latter to accommodate eccentric displacement thereof in the casing to provide friction for energy dissipation, spring means connected to the casing and acting on the inertia member to center the latter with respect to the rotor spin axis, and prebent spring means carried by the casing at the bottom thereof and providing the bearing area for supporting the inertia member.

8. In a gyro-vertical wherein the gyro rotor is journaled in a housing supported by gimbal means, apparatus for damping nutational oscillations of the housing and rotor comprising an annular casing connected to the housing and coaxial with the rotor spin axis, an annular inertia member within the annular casing and having radial clearance with respect to the inner and outer circumferential walls of the latter to accommodate eccentric displacement thereof in the casing to provide friction for energy dissipation, cantilever springs having their lower ends connected to the bottom wall of the casing and having their upper ends slidably engaging openings formed in the inertia member, said cantilever springs being so arranged in relation to the casing and to the inertia member as to act on the latter to center it with respect to the rotor spin axis, and leaf spring means interposed between the bottom wall of the casing and the inertia member and prebent to provide more uniform friction with respect to the inertia member under operating conditions.

LAWRENCE B. LYNN.
CLINTON R. HANNA.